United States Patent
Karpoff et al.

(10) Patent No.: US 10,564,955 B2
(45) Date of Patent: Feb. 18, 2020

(54) METHOD TO MANAGE MULTIPLE VERSIONS OF PARTS OF A SOFTWARE APPLICATION AND TO RETIRE OLDER VERSIONS IN A DYNAMICALLY UPDATABLE SOFTWARE SYSTEM

(71) Applicant: Huawei Technologies Co., Ltd., Shenzhen (CN)

(72) Inventors: Marcus Theodore Chernenko Karpoff, Sherwood Park (CA); Jose Nelson Amaral, Edmonton (CA); Kai-Ting Amy Wang, Toronto (CA); Brice Adam Dobry, Kingsville, MD (US)

(73) Assignee: Huawei Technologies Co., Ltd., Shenzhen (CN)

( * ) Notice: Subject to any disclaimer, the term of this patent is extended or adjusted under 35 U.S.C. 154(b) by 113 days.

(21) Appl. No.: 15/861,132

(22) Filed: Jan. 3, 2018

(65) Prior Publication Data

US 2019/0205113 A1    Jul. 4, 2019

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC ............. G06F 11/2094; G06F 12/0253; G06F 11/2097
USPC .................. 707/713, 820; 711/170; 717/170
See application file for complete search history.

(56) References Cited

U.S. PATENT DOCUMENTS

| | | | | |
|---|---|---|---|---|
| 5,960,087 A | * | 9/1999 | Tribble | G06F 12/0261 380/30 |
| 6,247,037 B1 | * | 6/2001 | O'Callaghan | G06E 3/005 708/816 |
| 7,506,317 B2 | * | 3/2009 | Liang | G06F 11/3466 711/170 |
| 8,301,671 B1 | * | 10/2012 | Greenwood | G06F 11/2094 707/813 |
| 2003/0009630 A1 | | 1/2003 | Morris et al. | |
| 2004/0158589 A1 | * | 8/2004 | Liang | G06F 11/3466 |

(Continued)

FOREIGN PATENT DOCUMENTS

JP    2004185226 A    7/2004

OTHER PUBLICATIONS

Chen, H, et al., "Dynamic Software Updating Using a Relaxed Consistency Model," IEEE Transactions on Software Engineering, Sep./Oct. 2011, pp. 679-694, vol. 37 No. 5.

(Continued)

*Primary Examiner* — John Q Chavis
(74) *Attorney, Agent, or Firm* — Slater Matsil, LLP (57) ABSTRACT

An embodiment method for retiring a dynamically updatable function includes receiving, by a collector-thread, a registration of the function, wherein the registration indicates to the collector-thread addresses of memory locations for counters that count a number of calls currently being made to a previous version of the function by a plurality of execution threads; reading, by the collector-thread, values of the counters; and when the values of all the counters are zero, deleting, by the collector-thread, the function from a storage medium on a device previously executing the previous version of the function.

17 Claims, 5 Drawing Sheets

(56) References Cited

U.S. PATENT DOCUMENTS

| | | | | |
|---|---|---|---|---|
| 2012/0131070 A1* | 5/2012 | Bacon | ................ | G06F 12/0261 |
| | | | | 707/815 |
| 2012/0278581 A1* | 11/2012 | Thomas | ................ | G06F 8/4442 |
| | | | | 711/166 |
| 2016/0314054 A1* | 10/2016 | Bates | .................... | G06F 3/0604 |
| 2017/0031815 A1* | 2/2017 | Varma | ................ | G06F 12/0253 |
| 2017/0187797 A1* | 6/2017 | Wang | ................ | H04L 67/1027 |

OTHER PUBLICATIONS

Haydent, C,N., et al., "Kitsune: Efficient, General-Purpose Dynamic Software Updating for C", ACM Transactions on Programming Languages and Systems, Oct. 2014, 38 pages, vol. 36, No. 4, Article 13, Tucson, Arizona, USA.

* cited by examiner

METHOD TO MANAGE MULTIPLE VERSIONS OF PARTS OF A SOFTWARE APPLICATION AND TO RETIRE OLDER VERSIONS IN A DYNAMICALLY UPDATABLE SOFTWARE SYSTEM

TECHNICAL FIELD

The present disclosure relates generally to dynamically updatable software systems and, in particular embodiments, to systems and methods to monitor multiple versions of parts of a software application and to retire older versions in a dynamically updatable software system.

BACKGROUND

Dynamic Software Updating (DSU) is a feature of a software application that allows a new version of the software application to be brought into operation without stopping the execution of a previous version of the software application when enabled. DSU might be helpful for the maintenance and evolution of mission-critical and zero-downtime applications, because DSU allows a software application to be updated while the software application is executing. A software application in which the DSU feature is enabled allows the software application to evolve to accommodate new requirements that were not anticipated in the original design of the software application and also enables the fixing of bugs that are discovered after the software application is deployed.

A DSU system is used to enable DSU in a software application. A DSU system can be classified as restrictive or permissive. A restrictive system allows an update to occur only at a safe point. A permissive system allows updates at any execution point. A DSU system can also be classified as a lockstep system or a multiple-version system. A lockstep system disallows updates until all threads of the software application have finished executing an older version and have migrated to a newer version. A multiple-version system allows multiple versions of the same module to execute at the same time. DSU systems can also be classified as function level, module level, whole program level, single-threaded, and/or multi-threaded. Existing DSU systems, however, either do not retire older versions or require synchronization overhead to retire older versions.

SUMMARY

In accordance with an embodiment of the present disclosure, a method for retiring a dynamically updatable function within an application comprises receiving, by a collector-thread, a registration of the function, wherein the registration indicates to the collector-thread addresses of memory locations for counters that count a number of currently active calls of a previous version of the function by a plurality of execution threads; reading, by the collector-thread, values of the counters; and when the values of all the counters are zero, deleting, by the collector-thread, the function from a storage medium on a device previously executing the previous version of the function.

In the previous embodiment, the registration might further create a pointer that points to a most recent version of the function such that calls to the most recent version of the function are made through indirect calls via the pointer. In any of the previous embodiments, calls that are made to the function after the registration has occurred and that are made by an execution thread that was not executing the function when the registration occurred might be made to the most recent version of the function. In any of the previous embodiments, a counter for calls made to the most recent version of the function might be incremented when a call to the most recent version of the function is made. In any of the previous embodiments, calls that are made to the function after the registration has occurred and that are made by an execution thread that was executing the function when the registration occurred might be made to the previous version of the function while a counter for calls made to the previous version of the function by the execution thread does not have a value of zero. In any of the previous embodiments, calls that are made to the function after the registration has occurred and that are made by the execution thread that was executing the function when the registration occurred might be made to a most recent version of the function after the counter for calls made to the previous version of the function by the execution thread reaches a value of zero. In any of the previous embodiments, the reading of the values of the counters might occur at one of fixed intervals, intervals calculated based on a frequency of a change of a value of one of the counters, or intervals learned by machine learning.

In accordance with another embodiment of the present disclosure, a device comprises a non-transitory memory storage comprising instructions and one or more processors in communication with the memory storage. The one or more processors execute the instructions to receive, by a collector-thread, a registration of a function stored in the memory storage and executable by the processors, wherein the registration indicates to the collector-thread addresses of memory locations for counters that count a number of currently active calls of a previous version of the function by a plurality of execution threads; read, by the collector-thread, values of the counters; and when the values of all the counters are zero, delete, by the collector-thread, the function from the memory storage.

In the previous embodiment, the processors might further execute the instructions to create a pointer that points to a most recent version of the function such that calls to the most recent version of the function are made through indirect calls via the pointer. In any of the previous embodiments, the processors might further execute the instructions such that calls that are made to the function after the registration has occurred and that are made by an execution thread that was not executing the function when the registration occurred are made to the most recent version of the function. In any of the previous embodiments, the processors might further execute the instructions such that a counter for calls made to the most recent version of the function is incremented when a call to the most recent version of the function is made. In any of the previous embodiments, the processors might further execute the instructions such that calls that are made to the function after the registration has occurred and that are made by an execution thread that was executing the function when the registration occurred are made to the previous version of the function while a counter for calls made to the previous version of the function by the execution thread does not have a value of zero. In any of the previous embodiments, the processors might further execute the instructions such that calls that are made to the function after the registration has occurred and that are made by the execution thread that was executing the function when the registration occurred are made to a most recent version of the function after the counter for calls made to the previous version of the function by the execution thread reaches a value of zero. In any of the previous embodiments, the processors might further execute the instructions such that the collector-thread reads the values of the counters occurs at one of fixed intervals, intervals calculated based on a frequency of a change of a value of one of the counters, or intervals learned by machine learning.

In accordance with another embodiment of the present disclosure, a dynamic software updating system comprises a plurality of counters and a collector-thread. The plurality of counters are configured to count calls by a plurality of execution threads to a previous version of a function executing on each of the plurality of execution threads after a most recent version of the function has been made available. The collector-thread is configured to read values of the counters and to delete the previous version of the function when the values of all the counters are zero.

In the previous embodiment, calls that are made to the function after the most recent version of the function was made available and that are made by an execution thread that was not executing the function when the most recent version of the function was made available might be made to the most recent version of the function. In any of the previous embodiments, a counter for calls made to the most recent version of the function might be incremented when a call to the most recent version of the function is made. In any of the previous embodiments, calls that are made to the function after the most recent version of the function was made available and that are made by an execution thread that was executing the function when the most recent version of the function was made available might be made to the previous version of the function while a counter for calls made to the previous version of the function by the execution thread does not have a value of zero. In any of the previous embodiments, calls that are made to the function after the most recent version of the function was made available and that are made by the execution thread that was executing the function when the most recent version of the function was made available might be made to the most recent version of the function after the counter for calls made to the previous version of the function by the execution thread reaches a value of zero. In any of the previous embodiments, the collector-thread might read the values of the counters at one of fixed intervals, intervals calculated based on a frequency of a change of a value of one of the counters, or intervals learned by machine learning.

In accordance with another embodiment of the present disclosure, a method for transforming a function in a software application into a function enabled for DSU comprises receiving, by a DSU transformer tool, an indication specifying at least one function in the software application to be transformed into the function enabled for DSU; replacing, by the DSU transformer tool, all direct calls to the at least one function in the software application by indirect calls through use of a pointer; and enabling, by the DSU transformer tool, all declarations and definitions in the at least one function in the software application to be automatically updated.

In the previous embodiment, the function enabled for DSU might be dynamically updated by changing an address of a pointer to the function enabled for DSU. In any of the previous embodiments, declarations of global variables in the at least one function in the software application with a keyword "extern" might be removed from the at least one function in the software application and placed in a file with the keyword "extern." In any of the previous embodiments, a name of the function enabled for DSU might include types of arguments the function enabled for DSU takes and types of return values returned by the function enabled for DSU.

An advantage of an embodiment of the present disclosure is that the disclosed method and system allow specific functions within a software application whose DSU feature is enabled to be dynamically updated without any synchronization among multiple running threads. Further, old versions of functions can be deleted when no longer in use without any synchronization among multiple running threads.

BRIEF DESCRIPTION OF THE DRAWINGS

For a more complete understanding of the present disclosure, and the advantages thereof, reference is now made to the following descriptions taken in conjunction with the accompanying drawings, in which.

DETAILED DESCRIPTION OF ILLUSTRATIVE EMBODIMENTS

The making and use of embodiments of this disclosure are discussed in detail below. It should be appreciated, however, that the concepts disclosed herein can be embodied in a wide variety of specific contexts and that the specific embodiments discussed herein are merely illustrative and do not serve to limit the scope of the claims. Further, it should be understood that various changes, substitutions and alterations can be made herein without departing from the spirit and scope of this disclosure as defined by the appended claims.

Several previous DSU systems allowed multiple versions of a software application (sometimes referred to hereinafter as an application) to co-exist. However, none of the previous known solutions monitor the usage of older versions of an application and retire older versions of the application that are no longer in use, while avoiding unnecessary overhead. In particular, previous studies have examined the issue of ensuring that versions of a component of a software application are consistent for a multi-version, permissive, multi-threaded DSU system. Other studies have described a whole-program, lockstep DSU system where an older version of an application can be retired once an update is complete. However, such studies did not provide a method to monitor and collect older versions of an application.

Existing techniques that retire older versions of an application might employ the lockstep strategy, where only a limited number of versions of the application—typically one old version and one new version—can be active at the same time. Updating might be disabled for a period of time in such techniques. DSU systems that allow many versions of an application to execute concurrently, typically do not make any provision for the retirement of older versions of the application that have been replaced by newer versions. Some such DSU systems might require atomic updating of counters, the use of locks for synchronization, and/or support for a transactional system. Such solutions might result in more overhead than the method and system disclosed herein.

Embodiments of the present disclosure provide a method and system for retiring older versions of a dynamically updatable function (e.g., a function whose DSU feature is enabled) that is no longer active in an application in which multiple versions of the application execute concurrently. As used herein, the term "dynamically updatable function" is referred to hereinafter as a "DSU function" and includes individual functions, entire classes, and/or other components of a software application that are dynamically updatable or a software application that is dynamically updatable.

In an embodiment, a DSU system includes reference counters and a collector-thread which are used to monitor the number of invocations (also known as calls) of each version of a DSU function. That is, the reference counters count how many times a version of a DSU function is called, and the collector-thread reads the values of the reference counters. Each thread, when executing, maintains its own counters. The embodiments allow specific DSU functions within an application to be dynamically updated without necessarily updating the entire application.

Each function of a software application that has been designated to be dynamically updatable is transformed to a DSU function, as described in further detail below, so that all calls to the DSU function are through indirect calls, thus allowing the DSU system to direct the calls to a newer version of the DSU function. Each call of the DSU function by an executing thread updates a thread-local counter, specific to that version of the DSU function. The source code for the DSU function is also changed to record the version that is currently called, so that the correct version's counter can be decremented upon exiting the DSU function. To update a DSU function, the DSU system registers a new version of the DSU function with the collector-thread. This registration contains a memory address indicating the location in memory where thread-local counters will be stored. There is a separate reference counter for each version of each DSU function for each thread. These reference counters are located in memory in a way that avoids false sharing, which could lead to unneeded synchronization operations by the cache coherence protocols.

Once the newer version of a DSU function is registered, every call by an executing thread of that function is to the newest registered version. An executing thread calling the DSU function increments the corresponding thread-local reference counter for the version being called. When an executing thread exits the DSU function, the executing thread decrements the thread-local reference counter for the corresponding version of the DSU function. From time to time, the collector-thread reads the value of the thread-local reference counter for the older versions of each DSU function. Whenever the collector-thread determines that all thread-local reference counters for an older version of a DSU function are zero, that version of the DSU function is retired or deleted.

The collector-thread only needs to read thread-local reference counters for DSU functions that have a newer version registered. A DSU function that only has a single version registered has not been updated since the last older version was retired and thus does not need to be monitored by the collector-thread.

To avoid unnecessary overhead, there is no synchronization between the read operations by the collector-thread and the updates to the thread-local reference counters by the executing threads. Thus, race conditions might exist between the collector-thread reads and the executing thread writes. These races are benign because the collector-thread is only reading thread-local reference counters corresponding to older versions of the DSU function. The counter for an older version cannot be incremented by an executing thread because every call to the DSU function is to the newest registered version. Thus, in the worst case, the collector-thread will miss a decrement of a counter to zero due to a data race and will incorrectly record that the version of the DSU function is still in use. This incorrect recording is inconsequential because the collector-thread periodically re-reads the counters and thus will capture the correct zero value for the counter on the next cycle of reading the counters.

In various embodiments, the frequency with which the collector-thread reads the counters of older versions of a DSU function is either fixed or variable. In either case, a programmer might specify how often the collector-thread reads the counters of older versions via, for example, command line arguments, environment variables, configuration files or other methods. In embodiments where the frequency with which the collector-thread reads the counters of older versions is variable, a static process that takes the value of the counters and the number of older versions for a given DSU function into consideration might be used to determine how long the collector-thread should wait until reading the counters for a given version again. Alternatively, a dynamic process might be used to vary the reading frequency based on monitoring of the number of versions in the DSU system and on the value of the invocation counters. For instance, the collector-thread might use a strategy such as exponential back-off to reduce the number of readings of the counters. That is, if no change in the value of a counter is observed in multiple initial counter readings, the counters might be read less frequently in subsequent readings. Alternatively, a machine learning process, such as reinforcement learning, might be used to discover an appropriate frequency for the collector-thread to monitor the reference counters. Such a learning strategy might require additional monitoring to determine how long a version that could have been retired remained in the system.

In an embodiment, the collector-thread is used to ensure that each running thread always calls the most recent version of each DSU function. In this embodiment, the process of updating a DSU function consists of registering the DSU function with the collector-thread. Whenever an executing thread enters a DSU function, the executing thread first obtains the newest version of the DSU function from the collector-thread.

In another embodiment, a table of function pointers is maintained by the DSU system. Executing threads are allowed to directly access the table of function pointers. In a shared-memory processor, this access results in each thread locally caching pointers to the most recent version of DSU functions that a thread calls frequently, thus increasing the performance of the DSU system. These local copies might be invalidated by the underlying cache coherence protocol whenever the collector-thread updates a pointer to activate a newer version of the function. In an embodiment, multiple function pointers are placed in memory in such a way to avoid false sharing, where unrelated local copies of pointers could be unwittingly invalidated.

In an embodiment, the DSU system is a permissive, multiple-version DSU system.

Figure 1A:
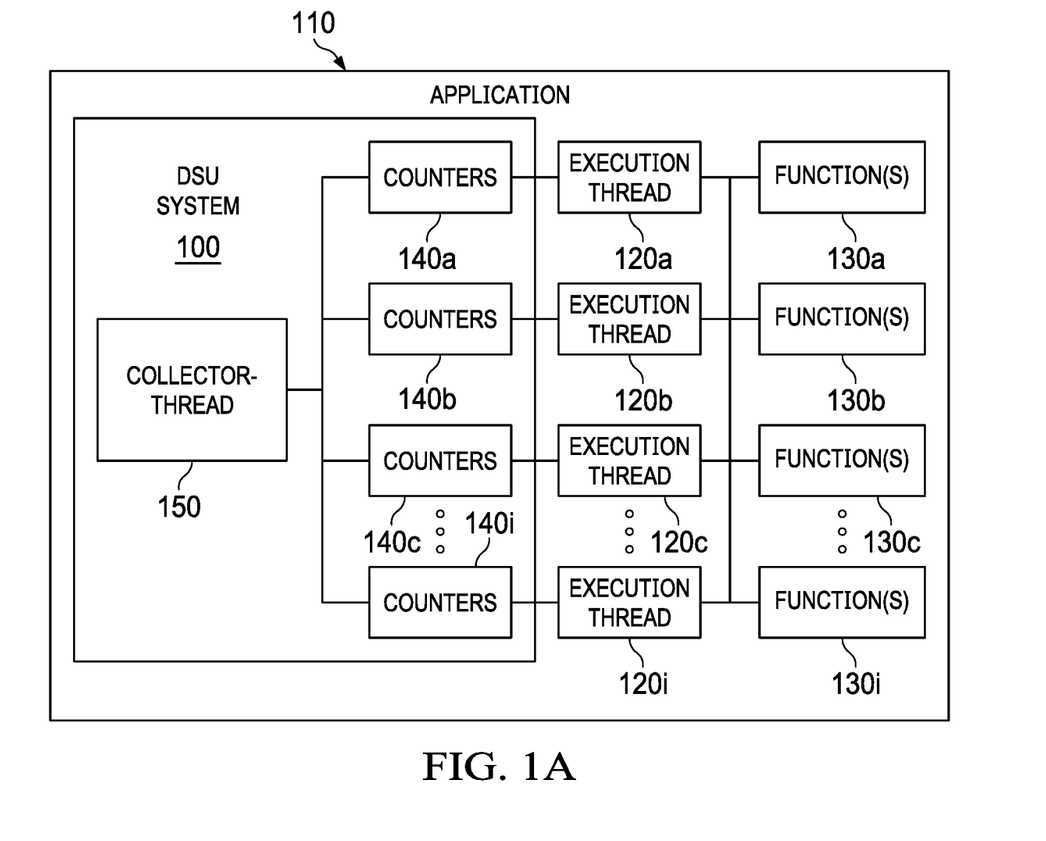
FIG. 1A is a block diagram illustrating an embodiment device on which the techniques disclosed herein are implemented.

FIG. 1A illustrates an embodiment DSU system 100 on which the dynamic software updating methods disclosed herein are implemented. The DSU system 100 is embedded in an application no that includes multiple execution threads 102a, 120b, . . . , 120i (generally referred to as execution thread 120 hereinafter). Each execution thread 120, when executing, can call multiple dynamically updatable functions 130a, 130b, . . . , 130i (generally referred to as DSU function 130 hereinafter). The block identified as function(s) 130a is used to represent one or more versions of function 130a, the block identified as function(s) 130b is used to represent one or more versions of function 130b, and so on. Versions of any of the DSU functions 130 that have different ages might exist concurrently in the application no. That is, one execution thread 120a, might be executing the most recent version of a DSU function 130a while another execution thread 120b might be executing a previous version of the same DSU function 130a. Any execution thread 120 can call or exit any function 130.

The DSU system 100 includes counters 140a, 140b, 140c, . . . , 140i (generally referred to hereinafter counter 140) and a collector-thread 150. Execution thread 130a is monitored by counter 140a that counts calls made by the execution thread 120a to each version of the DSU function 130a and also counts exits made from each version of the DSU function 130a. Similarly, execution thread 120b is monitored by counter 140b that counts calls made by the execution thread 120b to each version of the DSU function 130b and also counts exits made from each version of the DSU function 130b, execution thread 120c is monitored by counter 140c that counts calls made by the execution thread 120c to each version of the DSU function 130c and also counts exits made from each version of the DSU function 130c, and so on. Although only one counter 140a, 140b, 140c, . . . , 140i is shown for each corresponding execution thread 120a, 120b, 120c, . . . , 120i, in alternative embodiments a separate counter is present for each version of DSU functions 130a, 130b, 130c . . . , 130i called by an execution thread 120a, 120b, 120c, . . . , 120i. That is, there might be one counter, per function, per version, per thread. Although the counters 140a, 140b, 140c, . . . , 140i of the DSU system 100 are shown embedded inside the application no, the counters 140 might reside elsewhere. The collector-thread 150 periodically reads the values in the counters 140 and performs other functions related to the dynamic updating of the DSU functions 130, as described in more detail below.

In the following discussion, it will be assumed that DSU function 130a is to be dynamically updated. In an embodiment, when DSU function 130a is to be dynamically updated, the most recent version of DSU function 130a is registered with the collector-thread 150. The registration informs the collector-thread 150 that the most recent version of DSU function 130a is available and also indicates to the collector-thread 150 the addresses of the memory locations where the counters 140 will be stored. Each counter 140 has a separate memory location. The registration also updates a pointer that points to DSU function 130a so that all new calls to DSU function 130a are made to the most recent version of DSU function 130a through indirect calls via the pointer. That is, when a new call is made to DSU function 130a, the pointer is used to obtain the location of the most recent version of DSU function 130a.

In an embodiment, after the registration of the most recent version of DSU function 130a, when an execution thread 120 calls DSU function 130a, the call is made to the most recent version of DSU function 130a. For this and all subsequent calls thereafter, each call made by that execution thread 120 to DSU function 130a increments the counter 140 for the most recent version of DSU function 130a associated with that execution thread 120. Each exit from DSU function 130a by that execution thread 120 decrements the appropriate counter 140. That is, the execution thread 120 decrements the counter 140 associated with the previous version of DSU function 130a when exiting the previous version of DSU function 130a which, at the time of registration, was already executing, and the execution thread 120 decrements the counter 140 associated with the most recent version of DSU function 130a when exiting the most recent version of DSU function 130a which began executing after the time of registration.

In this way, a counter 140 keeps track of the number of calls that are currently being made by an execution thread 120 to the previous version of DSU function 130a. Once a new version of DSU function 130a is registered, the counters 140 for the previous versions can only be decremented, since all new calls are guaranteed to refer to the most recent version. Therefore, when a counter 140 for the previous version of DSU function 130a reaches zero, it is known that it is safe to retire or delete that previous version. The counter 140 that was counting calls to the previous version of DSU function 130a is maintained at zero so that that counter 140 can be read by the collector-thread 150 at a later time. While the discussion herein focuses on the case where only one previous version of DSU function 130a is present in the application no, it may be noted that multiple previous versions of DSU function 130a with different ages might be present in the application no.

Some DSU functions 130 might be recursive, wherein a recursive DSU function 130 can call itself one or more times. For such a DSU function 130, the associated counter 140 might increment and decrement multiple times, with the counter 140 being incremented on each entry into DSU function 130 (e.g., call to DSU function 130) and decremented on each exit from DSU function 130. The counter 140 for such a recursive DSU function 130 can have essentially any value, and some amount of time might pass before the counter 140 reaches '0'. The counter 140 for a non-recursive DSU function 130, on the other hand, might have values of only '1' or '0'. That is, a non-recursive DSU function 130 is either currently executing, in which case the counter 140 has a value of '1', or not currently executing, in which case the counter 140 has a value of '0'.

In an embodiment, from time to time, the collector-thread 150 reads the values in the counters 140. As discussed above, the frequency at which the collector-thread 150 reads the counters 140 might be fixed or might vary in some manner. In an embodiment, the collector-thread 150 can distinguish between a counter 140 that is counting calls to the most recent version of a DSU function 130 and a counter 140 that is counting or has been counting calls to the previous version of a DSU function 130. In an embodiment, the collector-thread 150 reads only the counters 140 that are counting or have been counting calls to the previous version of a DSU function 130. That is, there is no need for the collector-thread 150 to read the counters 140 that are counting calls to the most recent version of a DSU function 130, because such a DSU function 130 has already been updated. Thus, a counter 140 counting calls to a DSU function 130 might not be read until that DSU function 130 is updated.

Returning to the example where DSU function 130a has been updated, when the collector-thread 150 determines that the values of the counters 140 for the previous version of DSU function 130a are equal to zero on all of the execution threads 120, the collector-thread 150 knows that no further calls will be made to the previous version of DSU function 130a by any of the execution threads 120. In such a case, the collector-thread 150 takes appropriate steps to initiate the retirement or deletion of the previous version of DSU function 130a from the application no. In particular, the collector-thread 150 of the DSU system 100 deletes the previous version of DSU function 130a from the memory of a device on which the application no is executing. At that point, all future calls to DSU function 130a by any of the execution threads 120 are made to the most recent version of DSU function 130a.

Figure 1B:
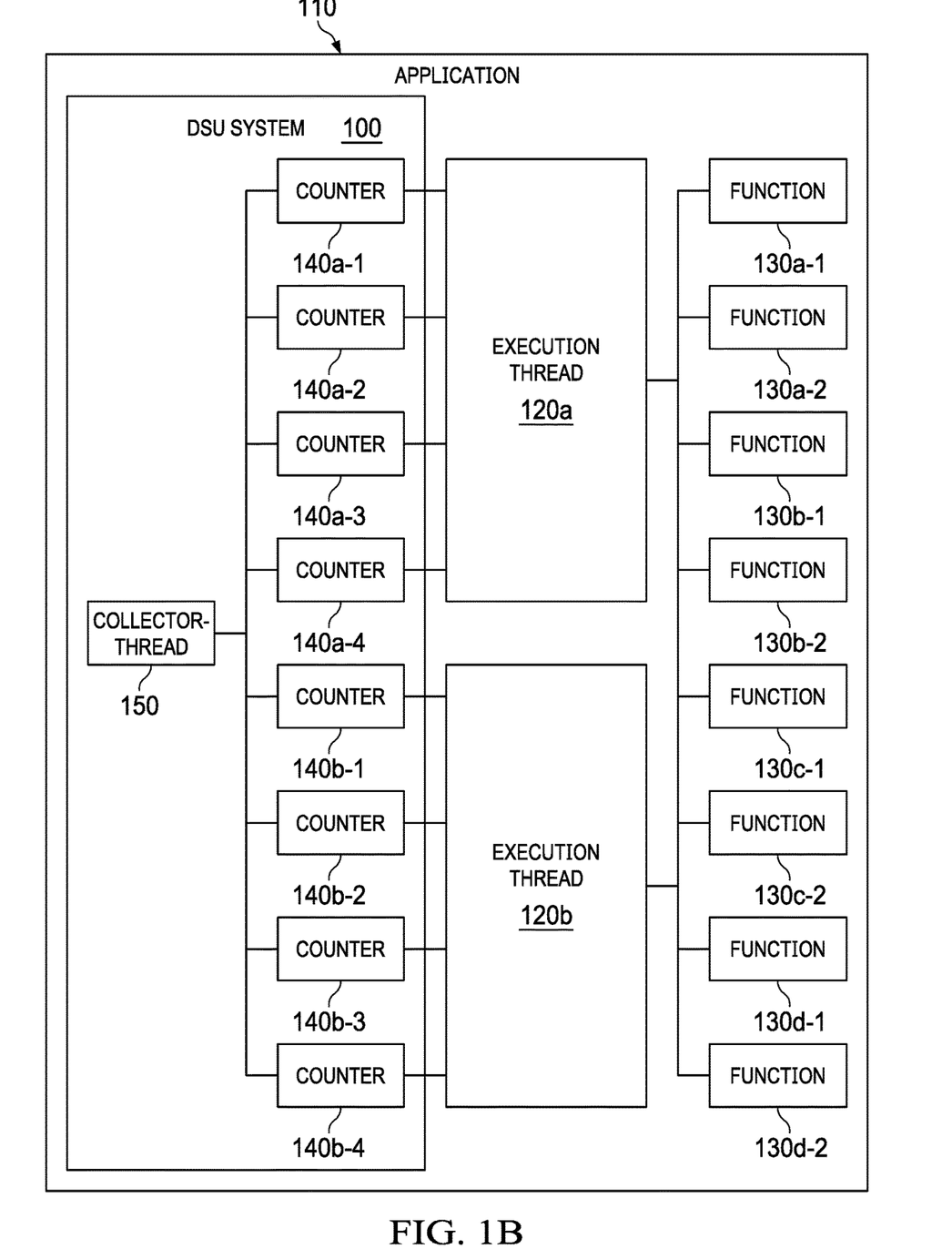
FIG. 1B is a block diagram illustrating an example embodiment of the DSU system and application of FIG. 1.

FIG. 1B illustrates an example embodiment of the DSU system 100 and application no of FIG. 1A. In this example, the application no has two execution threads 120a, 120b, either of which can execute any of four functions 130a, 130b, 130c, 130d. Function 130a has two versions 130a-1, 130a-2 available for execution, function 130b has two versions 130b-1, 130b-2 available for execution, function 130c has two versions 130c-1, 130c-2 available for execution, and function 130d has two versions 130d-1, 130d-2 available for execution. In this example embodiment, the DSU system 100 includes a separate counter for each version of DSU functions 130a, 130b, 130c, 130d. That is, the DSU system 100 includes eight counters 140a-1, 140a-2, 140a-3, 140a-4, 140b-1, 140b-2, 140b-3, 140b-4, with counters 140a-1, 140a-2, 140a-3, 140a-4 being associated with execution thread 120a, and counters 140b-1, 140b-2, 140b-3, 140b-4 being associated with execution thread 120b. Counter 140a-1 counts calls to and exits from version 130a-1 of function 130a by execution thread 120a, counter 140a-2 counts calls to and exits from version 130a-2 of function 130a by execution thread 120a, counter 140a-3 counts calls to and exits from version 130b-1 of function 130b by execution thread 120a, and counter 140a-4 counts calls to and exits from version 130b-2 of function 130b by execution thread 120a. Similarly, counter 140b-1 counts calls to and exits from version 130c-1 of function 130c by execution thread 120b, counter 140b-2 counts calls to and exits from version 130c-2 of function 130c by execution thread 120b, counter 140b-3 counts calls to and exits from version 130d-1 of function 130d by execution thread 120b, and counter 140b-4 counts calls to and exits from version 130d-2 of function 130d by execution thread 120b. In this example embodiment, the collector-thread 150 periodically reads the values in the eight counters 140a-1, 140a-2, 140a-3, 140a-4, 140b-1, 140b-2, 140b-3, 140b-4 and performs other functions related to the dynamic updating of the DSU functions 140a, 130b, 130c, 130d, as described in more detail below.

Figure 2:
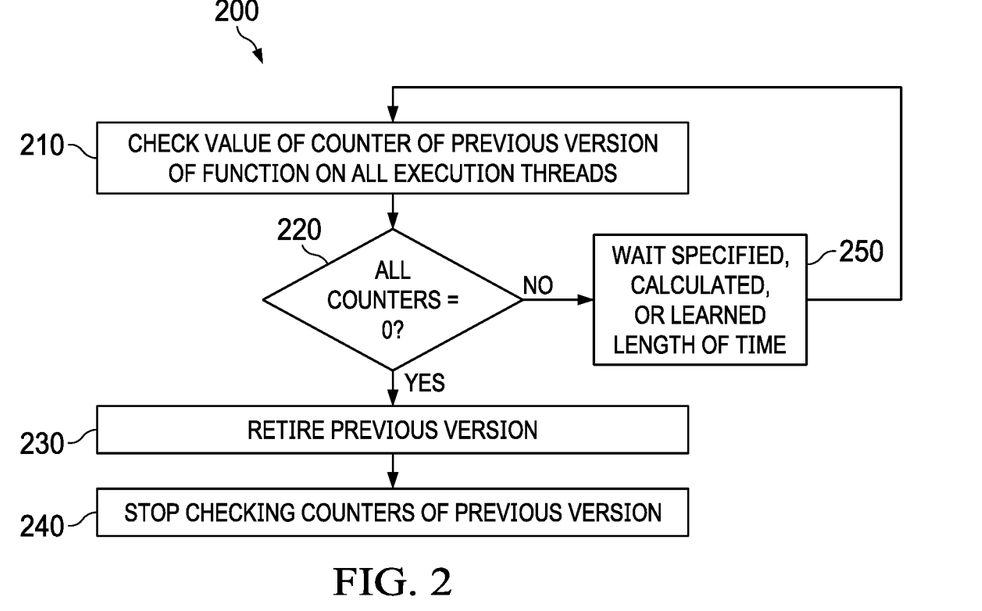
FIG. 2 is a flowchart of embodiment steps taken by a collector-thread.

FIG. 2 illustrates embodiment actions 200 taken by the collector-thread 150. At block 210, the collector-thread 150 checks the values of the counters 140 of a previous version of a DSU function 130 on all execution threads 120 of a dynamically updatable application. At block 220, the collector-thread 150 determines whether all of the counters 140 have a value of zero. At block 230, if all of the counters 140 have a value of zero, the collector-thread 150 takes steps to retire the previous version of the DSU function 130. At block 240, the collector-thread 150 stops checking the values of the counters 140 of the previous version of the DSU function 130. If, at block 220, the collector-thread 150 determines that all of the counters 140 do not have a value of zero, the collector-thread 150 waits for some length of time (otherwise referred to as a time interval). The length of time might be a fixed length of time specified by a programmer, might be calculated using an exponential back-off or a similar method, might be learned through machine learning or a similar method, or might be determined in some other way. After waiting the length of time, the collector-thread 150, at block 210, again checks the values of the counters 140 of the previous version of the DSU function 130 and the actions 200 repeat.

Figure 3:
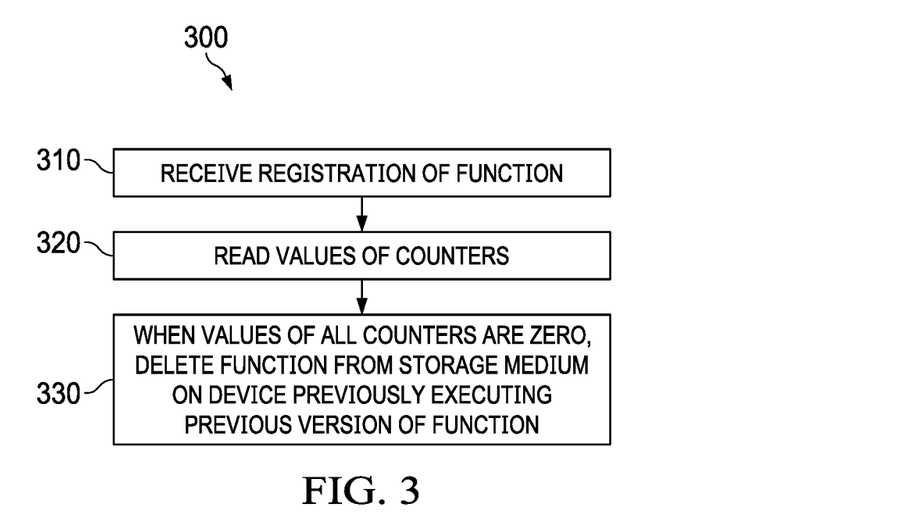
FIG. 3 is a flowchart of an embodiment method for retiring a dynamically updatable function.

FIG. 3 illustrates an embodiment method 130 for retiring a dynamically updatable function (e.g., a DSU function 130). At block 310, collector-thread 150 receives a registration of the DSU function 130. The registration indicates to the collector-thread 150 addresses of memory locations for counters 140 that count the number of calls currently being made to a previous version of the DSU function 130 by a plurality of execution threads 120. At block 320, the collector-thread 150 reads values of the counters 140. At block 330, when the values of all the counters 140 are zero, the collector-thread 150 deletes the DSU function 130 from a storage medium on a device previously executing the previous version of the function.

Figure 4:
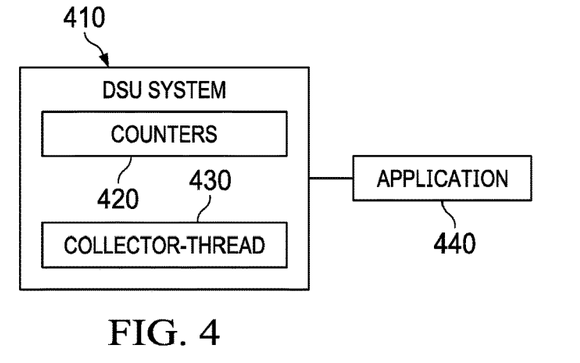
FIG. 4 is a block diagram illustrating an embodiment dynamic software updating system.

FIG. 4 illustrates an embodiment dynamic software updating system 410. The dynamic software updating system 410 includes a plurality of counters 420 and a collector-thread 430. The counters 420 are configured to count calls by a plurality of execution threads in an application 440 to a previous version of a function executing on each of the plurality of execution threads after a most recent version of the function has been made available. The collector-thread 430 is configured to read the values of the counters 420 and to delete the previous version of the function when the values of all the counters are zero.

The above discussion has been directed toward the management of software applications that are dynamically updatable. The following discussion is directed toward embodiments where a software application that was not originally dynamically updatable is modified to become dynamically updatable. In particular, the following discussion is directed toward embodiments where such modifications are made in an automated manner.

Most DSU systems require that the software application be designed for DSU. For instance, many DSU systems restrict updates to take place at a specific safe update point. A programmer might directly modify existing legacy software applications to enable DSU. However, such hand modifications are difficult and error prone, especially if the goal is to allow the dynamic updating of individual functions of a software application coded in a pointer-based programming language such as C. Updating a single function might require the creation of a level of indirection for the invocation of the function (otherwise known as a call to a function) and might also require that the function satisfy conditions that ensure that the updating is correct and safe.

Thus, a problem addressed by the embodiments disclosed herein is the problem of automatically changing a legacy software application to enable a specified set of functions of the legacy software application to be dynamically updated. A solution to this problem might need to include provisions to ensure that the dynamic updating results in a safe and correct software application and preserves the integrity of the data processed by the software application. In the remainder of this disclosure, the term "legacy function" is used to refer to a function that was not enabled for dynamic software updating in an original legacy software application and that is specified to be transformed into a DSU function using the methods and systems disclosed herein.

In an embodiment, a method and system are provided for transforming a legacy function into a DSU function. In particular, a DSU specification format is used to specify the functions of the legacy software application that are to be made dynamically updatable. A DSU transformation system is provided to read the specification provided in this format and to automatically transform the legacy software application to enable the dynamic updating of the functions specified. Data storage is automatically transformed, as needed, to guarantee the integrity of the data processed by the transformed legacy software application when dynamic updating occurs. Provisions are also provided to verify that a function of the legacy software application specified for dynamic updating is eligible for updating. For example, an automatic analysis might be performed to verify that dynamically updating each function of the legacy software application that was specified for dynamic updating is correct and safe.

More specifically, an input means is provided to enable a programmer to specify which functions in an existing software application are to be transformed into DSU functions. Given the source code for the legacy software application and the specification of the legacy functions, the source code is automatically analyzed and transformed to convert each call of each specified legacy function into an indirect call. A transformed version of the program source code is also automatically generated. In this transformed version, the declarations and definitions of a function as well as all calls to the function are transformed to enable their dynamic updating. The code transformation for each call of a legacy function consists of replacing a direct call by an indirect call through a pointer whose address is stored in a function pointer table. Using this mechanism, a legacy function can be dynamically updated by changing the address of the pointer target in the function pointer table.

In an embodiment, support code and data storage for the management and operation of a DSU system are automatically generated. For example, if reference counters are needed to monitor which old versions of a legacy function are still active, then the data storage for such counters and the code to update such counters are automatically generated. These data structures, if needed, are added to the existing code prior to final compilation.

In an embodiment, a method is also provided to enable the maintenance of a single copy of each global variable when multiple versions of the same function are reading and writing the value of a global variable. The use of this single global variable is enabled through the use of dynamic linking. For instance, in the C and C++ programming languages, the creation of a global variable requires that a single file create the variable. For example, the creation of the variable can take the form:

int a;

Then all other files that reference this variable will contain a declaration using the keyword "extern" to indicate that this variable was created elsewhere. In this example, all other files will contain the declaration:

extern int a;

In the disclosed transformations of legacy functions, an issue might occur when a global variable is created in a file that contains a legacy function and the entire module that includes the legacy function is to be replaced. It might be preferable for such a global variable to be created only once without the "extern" keyword and for all other versions of the module to declare the variable as "extern". In an embodiment, to address this issue, a feature from the command used to open a dynamic library, "dlopen", is employed. The transformation of the legacy function lifts all the declarations of global variables that appear in the legacy function file without the use of the keyword "extern" and places the declarations in a separate file with the keyword "extern". This separate file is then opened once using the "dlopen" command with the flag RTL_GLOBAL, already available for the "dlopen" command. The RTL_GLOBAL flag makes symbols declared as "extern" in the loaded dynamic library available for subsequently loaded libraries. In the file that contains the legacy function, all external variable declarations are changed to use the keyword "extern".

The function pointer table can be inserted into the source code using a source-to-source translation process. Such a process modifies all calls to legacy functions to indirect calls with the target obtained from the function pointer table instead. An advantage of the source-to-source transformation process is that, with this approach, the DSU system is independent of the compiler used to generate executable code.

In an embodiment, an analysis is performed that determines if a function satisfies the conditions for dynamic updating. Error messages are issued to the programmer informing the programmer that selected functions cannot be dynamically updated and providing the reason or reasons for the restriction.

In an embodiment, rather than a function name being merely an identifier of the function, the function name of a dynamically updatable function (e.g., a DSU function) includes the types of arguments the function takes and the type of the return value of the function.

In an embodiment where the target program is multi-threaded, separate data structures are maintained for each thread. These data structures are inserted in the same fashion as for the single threaded method. This procedure allows each individual thread to function in the same manner as if the individual thread were an independent thread.

Figure 5:
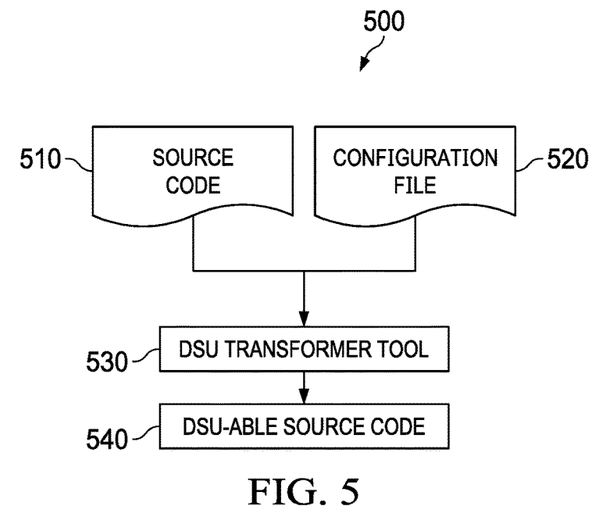
FIG. 5 is a block diagram illustrating an embodiment system for transforming a legacy function into a DSU function.

FIG. 5 is a block diagram illustrating a system 500 for transforming a legacy function into a DSU function. Source code 510 for a legacy function and a configuration file 520 are fed into a DSU transformer tool 530. The configuration file 520 might specify which legacy functions in the source code 510 are to be transformed into DSU functions. The DSU transformer tool 530 automatically analyzes and transforms the source code 510 to convert each call of each specified legacy function into an indirect call. The DSU transformer tool 530 also automatically generates a transformed, DSU-enabled version 540 of the source code 510. In the transformed version 540 of the source code 510, the declarations and definitions of each specified function as well as all calls to each specified function are transformed to enable dynamic updating of the specified functions. The DSU transformer tool 530 might perform the code transformation by replacing a direct call with an indirect call through a pointer whose address is stored in a function pointer table.

Figure 6:
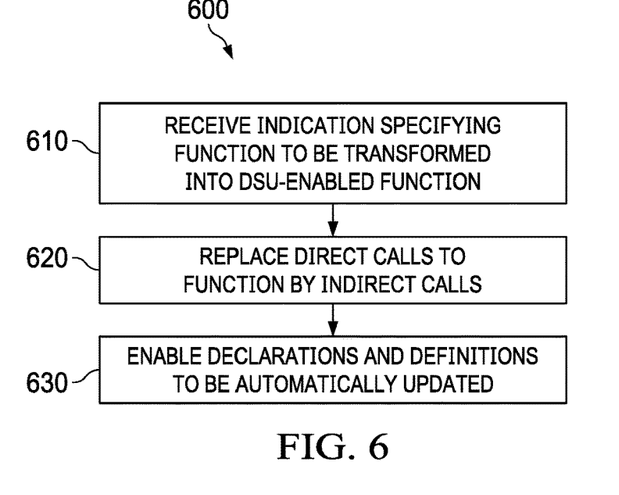
FIG. 6 is a flowchart of an embodiment method for transforming a legacy function into a DSU function.

FIG. 6 is a flowchart of an embodiment method 600 for transforming a legacy function into a DSU-enabled function. At block 610, an indication is received specifying at least one function in a legacy software application to be transformed into a function enabled to support dynamic updating. At block 620, direct calls to the at least one function in the legacy software application are automatically replaced by indirect calls through a pointer whose address is stored in a function pointer table. At block 630, declarations and definitions in the at least one function in the legacy software application are automatically transformed to enable the declarations and definitions to be dynamically updated.

Figure 7:
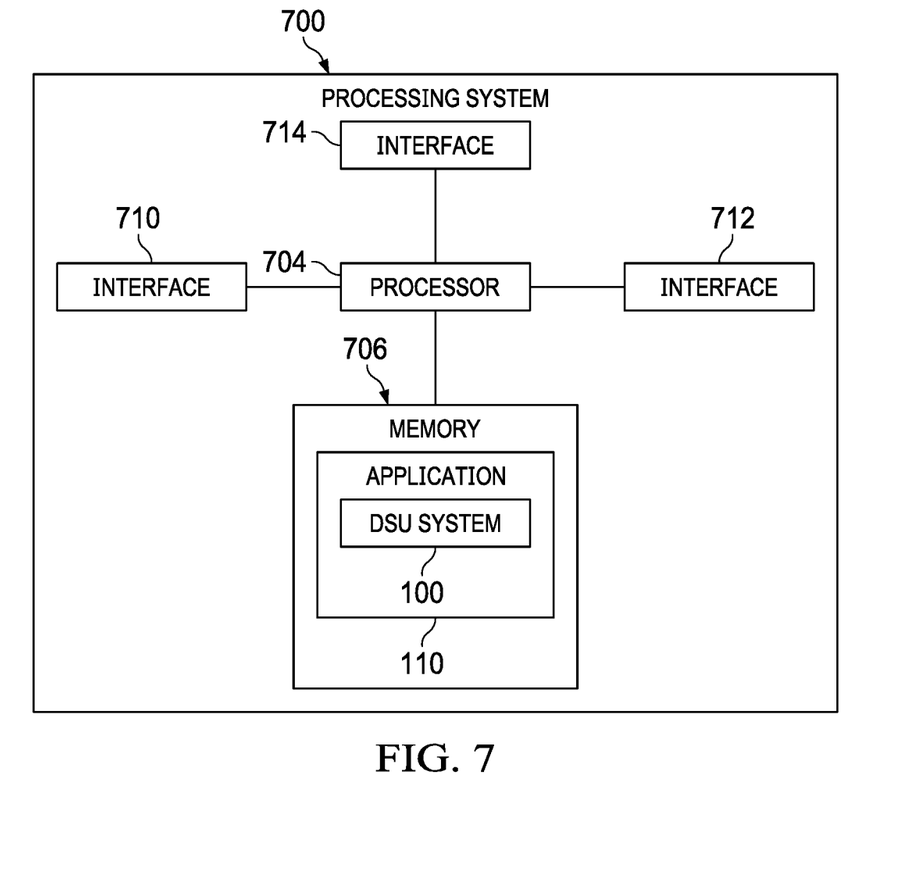
FIG. 7 is a block diagram illustrating an embodiment processing system for performing methods described herein.

FIG. 7 is a block diagram illustrating an embodiment processing system 700 for performing methods described herein, which may be installed in a host device. As shown, the processing system 700 includes a processor 704, a memory 706, and interfaces 710-714, which may (or may not) be arranged as shown in the figure. The processor 704 may be any component or collection of components adapted to perform computations and/or other processing related tasks, and the memory 706 may be any component or collection of components adapted to store programming and/or instructions for execution by the processor 704. In an embodiment, the memory 706 includes a non-transitory computer readable medium. The interfaces 710, 712, 714 may be any component or collection of components that allow the processing system 700 to communicate with other devices/components and/or a user. For example, one or more of the interfaces 710, 712, 714 may be adapted to communicate data, control, or management messages from the processor 704 to applications installed on the host device and/or a remote device. As another example, one or more of the interfaces 710, 712, 714 may be adapted to allow a user or user device (e.g., personal computer (PC), etc.) to interact/communicate with the processing system 700. The processing system 700 may include additional components not depicted in the figure, such as long term storage (e.g., non-volatile memory, etc.).

In some embodiments, the processing system 700 is included in a network device that is accessing, or part otherwise of, a telecommunications network. In one example, the processing system 700 is in a network-side device in a wireless or wireline telecommunications network, such as a base station, a relay station, a scheduler, a controller, a gateway, a router, an applications server, or any other device in the telecommunications network. In other embodiments, the processing system 700 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

The processor 704 and the memory 706 might execute actions performed by and store instructions related to the execution threads 120, the functions 130, the counters 140, and the collector-thread 150 of FIGS. 1A and 1B. Although only one processor 704 is shown, multiple processors 704 might be present, each performing operations related to the application 110, the execution threads 120, the functions 130, the counters 140, and the collector-thread 150 of FIGS. 1A and 1B. The DSU system 100 and the application 110 of FIGS. 1A and 1B might reside in the memory 706 of the processing system 700.

It should be appreciated that one or more steps of the embodiment methods provided herein may be performed by corresponding units or modules. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs).

While this disclosure has been described with reference to illustrative embodiments, this description is not intended to be construed in a limiting sense. Various modifications and combinations of the illustrative embodiments, as well as other embodiments of the disclosure, will be apparent to persons skilled in the art upon reference to the description. It is therefore intended that the appended claims encompass any such modifications or embodiments.

What is claimed is:

1. A method for retiring a function within a software application, the function being dynamically updatable, the method comprising:
receiving, by a collector-thread, a registration of the function, wherein the registration indicates to collector-thread addresses of memory locations for counters that count a number of calls currently being made to a previous version of the function by a plurality of execution threads;
reading, by the collector-thread, values of the counters; and
when the values of all the counters are zero, deleting, by the collector-thread, the function from a storage medium on a device previously executing the previous version of the function, wherein calls that are made to the function after the registration has occurred and that are made by an execution thread that was executing the function when the registration occurred are made to the previous version of the function while a counter for calls made to the previous version of the function by the execution thread is not zero.

2. The method of claim 1, wherein the registration further creates a pointer that points to a most recent version of the function such that calls to the most recent version of the function are made through indirect calls via the pointer.

3. The method of claim 2, wherein calls that are made to the function after the registration has occurred and that are made by the execution thread that was not executing the function when the registration occurred are made to the most recent version of the function.

4. The method of claim 3, wherein the counter for the calls made to the most recent version of the function is incremented when a call to the most recent version of the function is made.

5. The method of claim 1, wherein the calls that are made to the function after the registration has occurred and that are made by the execution thread that was executing the function when the registration occurred are made to a most recent version of the function after the counter for the calls made to the previous version of the function by the execution thread reaches zero.

6. The method of claim 1, wherein the reading of the values of the counters occurs at one of:
fixed intervals;
intervals calculated based on a frequency of a change of a value of one of the counters; or
intervals learned by machine learning.

7. A device comprising:
a non-transitory memory storage comprising instructions; and
one or more processors in communication with the non-transitory memory storage, wherein the one or more processors execute the instructions to:
receive, by a collector-thread, a registration of a function stored in the non-transitory memory storage and executable by the processors, wherein the registration indicates to collector-thread addresses of memory locations for counters that count a number of calls currently being made to a previous version of the function by a plurality of execution threads;

read, by the collector-thread, values of the counters; and when the values of all the counters are zero, delete, by the collector-thread, the function from the non-transitory memory storage, wherein the processors further execute the instructions such that calls that are made to the function after the registration has occurred and that are made by an execution thread that was executing the function when the registration occurred are made to the previous version of the function while a counter for calls made to the previous version of the function by the execution thread is not zero.

8. The device of claim 7, wherein the processors further execute the instructions to create a pointer that points to a most recent version of the function such that calls to the most recent version of the function are made through indirect calls via the pointer.

9. The device of claim 8, wherein the processors further execute the instructions such that calls that are made to the function after the registration has occurred and that are made by the execution thread that was not executing the function when the registration occurred are made to the most recent version of the function.

10. The device of claim 9, wherein the processors further execute the instructions such that the counter for the calls made to the most recent version of the function is incremented when a call to the most recent version of the function is made.

11. The device of claim 7, wherein the processors further execute the instructions such that the calls that are made to the function after the registration has occurred and that are made by the execution thread that was executing the function when the registration occurred are made to a most recent version of the function after the counter for the calls made to the previous version of the function by the execution thread reaches zero.

12. The device of claim 7, wherein the processors further execute the instructions such that the collector-thread reads the values of the counters occurs at one of:
fixed intervals;
intervals calculated based on a frequency of a change of a value of one of the counters; or
intervals learned by machine learning.

13. A dynamic software updating system comprising:
a plurality of counters configured to count a number of calls by a plurality of execution threads to a previous version of a function executing on each of the plurality of execution threads after a most recent version of the function has been made available; and
a collector-thread configured to read values of the counters and to delete the previous version of the function when the values of all the counters are zero, wherein calls that are made to the function after the most recent version of the function was made available and that are made by an execution thread that was executing the function when the most recent version of the function was made available are made to the previous version of the function while a counter for calls made to the previous version of the function by the execution thread is not zero.

14. The dynamic software updating system of claim 13, wherein calls that are made to the function after the most recent version of the function was made available and that are made by the execution thread that was not executing the function when the most recent version of the function was made available are made to the most recent version of the function.

15. The dynamic software updating system of claim 14, wherein the counter for the calls made to the most recent version of the function is incremented when a call to the most recent version of the function is made.

16. The dynamic software updating system of claim 13, wherein the calls that are made to the function after the most recent version of the function was made available and that are made by the execution thread that was executing the function when the most recent version of the function was made available are made to the most recent version of the function after the counter for the calls made to the previous version of the function by the execution thread reaches zero.

17. The dynamic software updating system of claim 13, wherein the collector-thread reads the values of the counters at one of:
fixed intervals;
intervals calculated based on a frequency of a change of a value of one of the counters; or
intervals learned by machine learning.

* * * * *